Figure 1:
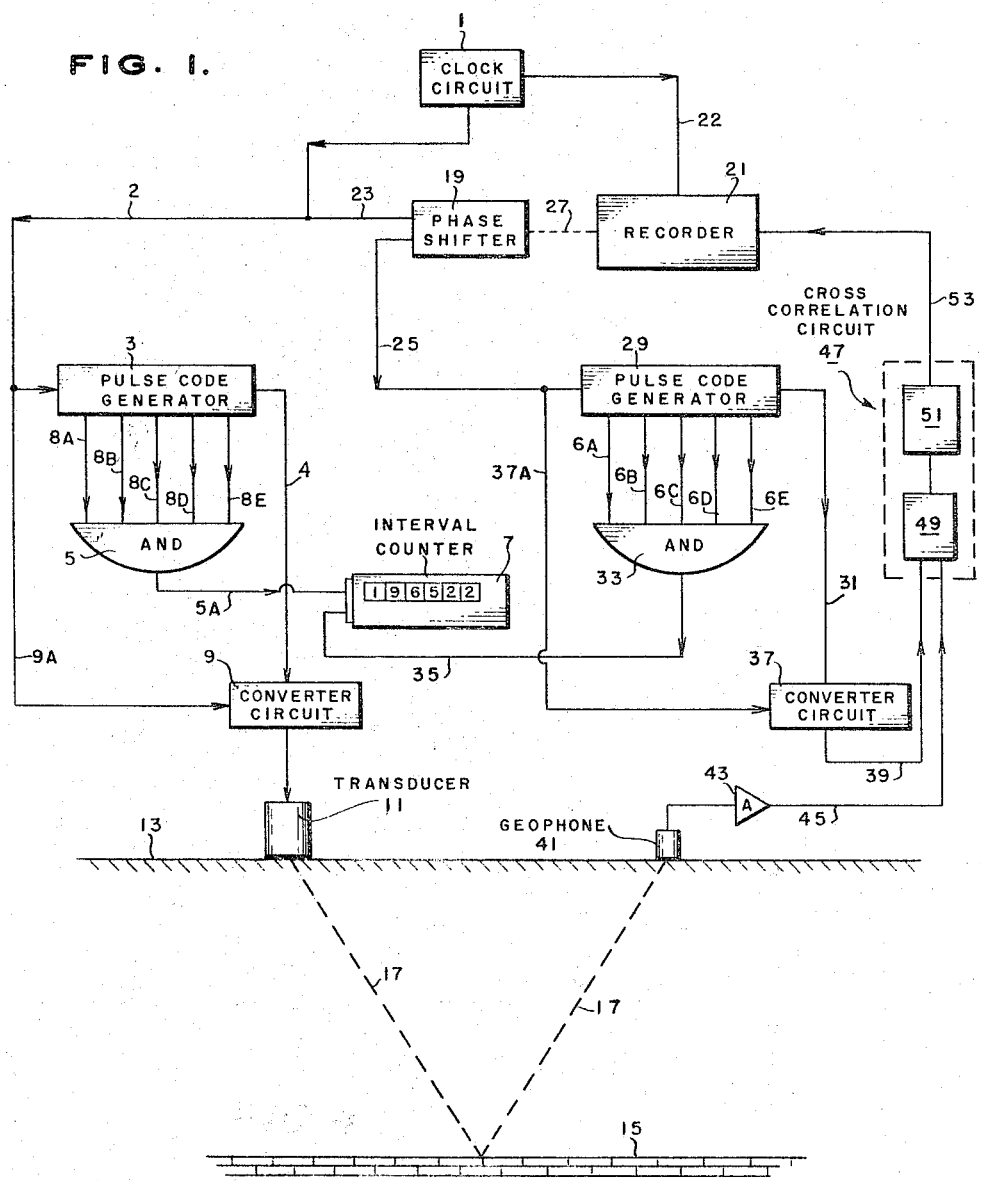

March 7, 1967  H. T. MASTERSON  3,307,648
INTERVAL COUNTING BINARY CODE SEISMIC PROSPECTING SYSTEM
Filed Nov. 2, 1964

INVENTOR.
HORACE T. MASTERSON,
BY John B. Davidson
ATTORNEY.

United States Patent Office 3,307,648
Patented Mar. 7, 1967

3,307,648
INTERVAL COUNTING BINARY CODE
SEISMIC PROSPECTING SYSTEM
Horace T. Masterson, Houston, Tex., assignor, by mesne assignments, to Esso Production Research Company, Houston, Tex., a corporation of Delaware
Filed Nov. 2, 1964, Ser. No. 408,176
3 Claims. (Cl. 181—.5)

This invention relates to the art of seismic prospecting, and more particularly to seismic prospecting techniques wherein elongated wave trains of seismic signals are injected into the earth.

In the usual type of seismic prospecting, a relatively sharp pulse of elastic wave energy is injected into the earth from a location at or near the earth's surface, and the resulting seismic waves are detected by means of geophones located at a plurality of detecting stations or locations spaced apart on the earth's surface. Electrical output signals from the geophones are simultaneously recorded to form a multiple trace seismogram. The seismogram is examined and operated on its various ways to pick out reflected, refracted, and diffracted waves therein that are indicative of the nature of subsurface strata. In order to determine the depth of a given stratum, the two-way travel time of the seismic waves between the earth's surface and the stratum (as well as the velocity of the waves in the strata through which the waves travel) must be measured very exactly. In this method of seismic prospecting, all of the elastic wave energy is injected into the earth at substantially the same time, and undesired components of the traces of the seismograms may be eliminated by frequency discrimination.

In another type of seismic prospecting that has found relatively limited use to date, an elongated vibratory seismic signal or wave train is injected into the earth. Preferably, the injected seismic signal is nonrepetitive during a time interval which is substantially longer than the travel time of the signal along the longest travel path of interest. Expressed in another manner, the duration of the signal is at least as long as the travel time of the signal along any of the paths by which it reaches a detecting location at usable energy levels. In the usual case in reflection seismographing, the longest travel path of interest will be the shortest path from the seismic wave source to the deepest reflecting horizon which it is deired to delineate and back to the earth's surface at the detecting location farthest removed from the seismic source. Seismic waves produced by the vibratory seismic signal are detected at one or more detecting locations removed from the injecting location. It has been the practice to produce a counterpart electrical replica of the injected signal (i.e., an electrical signal substantially identical to the injected seismic signal) by means of a geophone at the injecting location. This geophone may be either connected to the vibratory source or positioned in the earth near the source. The replica signal is cross correlated with each signal produced at the detecting stations. The cross correlation is carried out at a plurality of time-phase relationships between said each signal and the replica signal. The time-phase relationship of the replica signal and each signal cross correlated therewith which yields the greatest value of correlation is used as a parameter of the travel time of the injected signal from the injecting location to the detecting location corresponding to said each signal. Correlation between the replica signal and an electrical signal representative of detected seismic waves typically has been accomplished by initially recording both signals, reproducing the signals as time series, combining the time series emphasizing amplitude variations in the combined time series, integrating the resulting signal, and shifting the time-phase relationship (or $\tau$) between the reproduced signals with respect to their time-phase relationship as originally recorded. The general method is described in U.S. Patent No. 2,989,726—Crawford et al., and will be recognized as being of the type operating in the time domain.

A form of injected signal that has been widely used in the above-described method is that of a sinusoid which is continuously varied in frequency so as to be nonrepetitive over a desired time interval. The cross correlation curve resulting from a given reflection obtained with such a signal is that of a major lobe flanked by minor lobes diminishing in amplitude and extending from the major lobe in both directions on the "$\tau$" axis of the correlation curve. The side lobes may be of sufficient amplitude to mask all of the lobes of a relatively smaller amplitude correlation signal resulting from a reflection from a relatively poor reflecting horizon located near a good reflecting horizon. A much better type of injected seismic signal is a signal having an amplitude density spectrum given by the formula sin $X/X$ where $X$ represents frequency over a preselected frequency spectrum. Preferably, this type of seismic signal is formed according to a binary core of maximal length. The term "binary code of maximal length" signifies a binary code which may be represented as a reference time series, which code is formed by operating on a binary core group of N digits according to a predetermined rule of formation such that the code group will not repeat itself before $2^N-1$ digits. Expressed in another manner, a binary code group of maximal length is a binary code wherein a binary group of N digits at the bingining thereof is not repeated until the code has at least $2^N-1$ digits therein. For example, if the five digit code group 01101 is used, N will be equal to 5 and $2^N-1$ equals 31. A binary code of maximal length can be formed therefrom by starting off with the five digit code group 01101 and setting the next digit equal to the sum modulo 2 of the first, second, third, and fifth digits preceding it; this results in the six digit code group 011010. This process is repeated with the resulting code group 011010, again setting the next digit equal to the sum modulo 2 of the first, second, third, fifth digits preceding it to form the seven digit code group 0110100. The process is repetitively repeated to form each successive digit, and the following binary code is obtained before any five digit code group is repeated:

0110100011001001111110111000101

By applying the above-specified rule of formation, it will be found that after 31 digits, the sequence will repeat. For more complete discussion of shift register or null sequence code of maximal length, reference may be had to the following: "The Synthesis of Linear Sequential Coding Networks," by D. A. Huffman, Proc. Third London Symposium on Information Theory, September 1955; and "Several Binary-Sequence Generators" by N. Zierler, Tech. Rep. 95, Lincoln Laboratory, Massachusetts Institute of Technology, Cambridge, Massachusetts, September 1955.

Injecting a binary code of maximal length into the earth in the form of a seismic signal presupposes that a characteristic of the seismic signal is variable between two distinct conditions. For example, the amplitude may be varied between two magnitudes or the phase may be varied between two phase relationships. As a specific example, the injected signal may be made from a constant frequency sinusoidal signal of constant amplitude, the phase of which is varied between mutually opposite phase relationships in accordance with a binary code of maximal length having a time duration at least equal to twice the travel time of seismic waves between the earth's surface and the deepest earth reflecting horizon of interest.

As indicated above, it has been the usual practice to record the electrical signal produced by detecting the seismic signal in reproducible form so that the electrical signal subsequently may be reproduced and cross correlated with the electrically replica signal to determine the time-phase relationship producing a maximum correlation value. For several reasons it has been found necessary or desirable to perform correlation operations at a time subsequent to the time of the seismic observation. One reason is that the correlation operation consumes a very large amount of time. Also, it is quite costly to maintain a seismic crew in the field so as much as possible of the crew's time should be spent making seismic obervations. However, under some circumstances it is desirable to perform the correlation in the field. For example, it may be known that a possible interface exists at a particular depth and it is desirable to determine that depth as accurately as possible. A number of seismic observations may be performed and the correlation operation performed after each observation to compensate for errors and variables as much as possible. When such very accurate observations are in order, every effort must be expended to eliminate possible errors in the overall seismic technique. One very serious source of error is that the speed of magnetic tape on which geophone signals are usually recorded is subject to variations as the result of fluctuations in the tape transport speed control mechanism. Furthermore, the magnetic tape is subject to being stretched, which obviously can give rise to amplitude and time variations in correlograms.

It should also be noted that it is desirable to perform time-tie operations in boreholes to determine travel time of seismic waves between the earth's surface and various locations in the borehole. Such operations must be performed in a manner that eliminates every possible source of error insofar as such is possible. It is obvious that recording errors resulting from tape stretch and tape transport speed control fluctuations are as undesirable in this instance as in conventional seismic operations where extreme accuracy is required.

In accordance with the teachings of the present invention, a continuous wave seismic observation is carried out by injecting a vibratory seismic signal into the earth by driving an electro-acoustic or electro-seismic wave transducer by means of a signal generator, which signal generator includes an electrical code generator adapted to produce an electrical signal in accordance with a pseudo-random null sequence code of maximal length responsive to an actuating signal. Seismic wave detecting means stationed at a remote location and a second signal generator for producing an output signal identical to the output signal produced by the first signal generator responsive to an actuating signal coupled thereto are connected to a cross correlating means. The cross correlating means produces an output signal indicative of the correlation between the output signals of the seismic wave detecting means and the second electrical signal generator. Coupled to the first and second signal generators for supplying actuating signals thereto is an actuating means that is adapted to supply an actuating signal to the second signal generator means a predetermined time interval after an actuating signal is supplied to the first signal generator means. By varying the predetermined interval after each seismic observation, components of the signal detected by the seismic wave detecting means that are substantially identical to the signal produced by the second signal generator means can be brought into time coincidence with the signal produced by the second signal generator means. Thus, the travel time from the electro-seismic wave transducer to the seismic wave detecting means can be very accurately determined without requiring that the signal produced by the seismic wave detecting means be recorded on a recording medium before the correlation operation.

Figure 2:
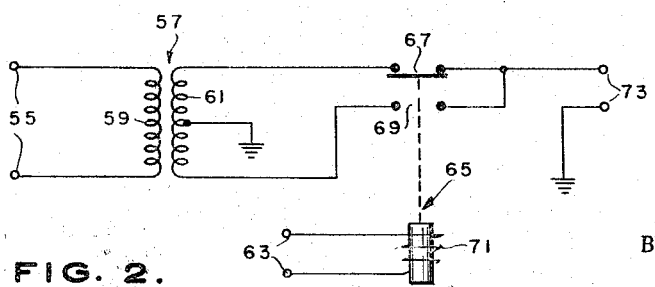

Objects and features of the invention not apparent from the above discussion will become evident upon consideration of the following detailed description of the invention when taken in connection with the accompanying drawings, wherein:

FIG. 1 is a schematic electrical diagram of apparatus for performing a seismic observation in accordance with the invention; and FIG. 2 is an electrical schematic diagram of the converting apparatus designated by reference numerals 9 and 37 in FIG. 1.

With reference now to FIG. 1, there is shown an electro-seismic wave transducer 11 positioned at a transmitting location on the earth's surface 13, and a seismic wave detecting means or geophone 41 positioned on the earth's surface at a detecting location more or less remote from the location of transducer 11. The transducer 11 may be any of a number of types of apparatus well known to the art, such as a loudspeaker or a vibrator adapted to convert electric signals to seismic waves through a hydraulic amplifier driving a vibratory plate. Apparatus of this nature is manufactured by the M. B. Electronics Company of New Haven, Connecticut and by the Ling Electronics Company of Anaheim, California.

Electrical actuating signals for driving the transducer 11 are derived from apparatus comprising an electrical pulse code generator 3 for producing an output signal variable between two conditions in accordance with a pseudo-random code, preferably a null sequence or shift register binary code of maximal length. The output signal of pulse code generator 3 is coupled to a converter circuit 9 which may be of the type described in detail with respect to FIG. 2. The function of converter 9 is to produce a signal having a sinusoidal wave shape for driving transducer 11, which signal is variable between mutually opposite phase relationships in accordance with the output pulses of pulse generator 3.

A second electrical pulse code generator 29 and a second converter circuit 37 are substantially identical to pulse code generator 3 and converter 9, respectively. The output signal of converter 37 appearing on lead 39 is coupled to a cross correlating circuit 47. Also coupled to cross correlating circuit 47 is the output signal of seismic wave detector 41, which may be amplified by amplifier 43 before being applied to the correlating circuit. The correlating circuit 47 may be of a well known type comprising a multiplier 49 for cross multiplying a pair of electrical signals, and an integrator 51 for integrating or averaging the output signal of the multiplier 49. However, other types of electrical cross correlators may be utilized, such as those described in U.S. Patent 2,927,656—Feagin et al. The signals appearing on lines 39 and 45 are applied to the input circuits of electrical signal multiplying circuit 49. The output signal of integrator 51 is the output signal of the correlator and is transmitted on line 53 to a conventional seismic recorder 21 for recording electrical signals as a function of time. The recorder may be of the type wherein excursions of a stylus from a base line are a function of the amplitude of the electrical signal on line 53, and wherein the stylus is driven along the axis of the base line as a function of time.

Actuating signals for code generators 3 and 29 are derived from a clock circuit 1 which produces a sinusoidal output signal of constant frequency. The output signal of clock circuit 1 is applied through a communications link, such as line 2 or a radio frequency link, to code generator 3, and through line 23, phase shifter 19, and line 25 to code generator 29. The clock output signal also is applied to converter 9 through line 9A, and is applied from line 25 to converter 37 by way of line 37A.

Code generators 3 and 29 may be of the type described in U.S. Patent 3,119,097—Tullos. As indicated above, the function of the code generator is to produce an electrical pulse signal variable in accordance with a pseudo-random code, preferably a null sequence code of maximal length, responsive to an actuating signal applied thereto. The code generator may comprise a multistage binary shift register and means for sequentially actuating the shift register binary in stages according to a predetermined program responsive to the actuating signal, to produce a shift binary electrical pulse code of maximal length at the output of each of the stages. The preferred code generator described in Patent 3,119,097 comprises a binary shift register counter including a chain of interconnected bistable MEMORY stages adapted to transfer stable states unilaterally along the chain responsive to an input signal coupled thereto. Each of the MEMORY stages is adapted to produce an output pulse when changing from one of the stable states thereof to the other of the stable states thereof. Signal delaying means, and circuit means connected to the binary counter and to the signal delaying means adapted to count output pulses from selected MEMORY stages and responsive to an electrical signal from the signal delaying means are effective to change the MEMORY stage at the end of the chain from said other stable state to said one stable state. Stable states transfer along the chain when an even number of output pulses from said selected MEMORY stages have been counted by said circuit means.

The phase shifter 19 may be a device such as is manufactured by the Diehl Manufacturing Company of Summerville, New Jersey and designated as Model B11PS, and described in Application Bulletin 608, published by the Diehl Manufacturing Company in July 1962. The phase shifter should be able to delay the signal at the output thereof (on line 25) by any phase angle relative to the signal appearing on line 23. The phase shift of a computing resolver and an associated R-C network, such as the phase shifter manufactured by the Diehl Manufacturing Company, can produce phase shifts of many thousands of electrical degrees so that the signal appearing on line 25 can be accurately delayed in time for many seconds with respect to the signal appearing on line 23.

AND circuits 5 and 33 are respectively connected to the various stages of the binary shift register counter of code generators 3 and 29. The function of AND circuits 5 and 33 is to produce an output signal when a particular count is registered in the shift register counter coupled thereto. For example, assuming that the shift register counter has five stages and that AND circuit 5 is connected to each of the stages by lines 8A, 8B, 8C, 8D, and 8E, an output pulse will appear on line 5A when the binary count registered is 11111. Likewise, AND circuit 33, which is connected to the stages of the binary counter of code generator 29 by lines 6A through 6E, will produce an output pulse when the binary count registered is 11111. The output signals from AND circuits 5 and 33 are respectively coupled to an interval counter 7 on lines 5A and 35 so that a pulse on line 5A from AND circuit 5 is effective to start the counting cycle of interval counter 7, and a pulse from AND circuit 33 on line 35 is effective to stop the interval counter. Thus, assuming that interval counter 7 registers a count every millisecond, the differences in the readings on the counting wheels of the interval counter at the beginning and end of a counting cycle will be the duration of the interval counted. Thus, assuming that the binary shift register counter of code generators 3 and 29 were in identical counting conditions at the beginning of the production of signals by clock 1, the count registered by interval counter 7 will be equal to the time delay effected by phase shifter 19.

Before describing the operation of the apparatus illustrated in FIG. 1, reference is made to FIG. 2 wherein is illustrated the circuit of suitable apparatus for use as converters 9 and 37. This apparatus comprises a transformer 57 including a primary winding 59 and center tapped secondary winding 61. The primary winding 59 is connected to input terminals 55, which terminals are connected to either of lines 9A and 37A, as appropriate. The center tap of secondary winding 61 is grounded. The outer terminals of secondary winding 61 are respectively connected to one of output terminals 73 through relay contacts 67 and 69 of relay 65. Contact 67 is normally open and contact 69 is normally closed. The actuating winding 71 of relay 65 is connected to terminals 63, which, in the circuit of FIG. 1, are connected to either line 4 or line 31, depending on whether converter 9 or converter 37 is in question. Output terminals 73 are connected to line 39 or to electro-seismic wave transducer 11. Thus, when a pulse from a code generator is applied to terminals 63, relay 65 is actuated to open contact 67 and close contact 69, thereby reversing the phase of the signal appearing across terminals 55. In this manner, a signal of one phase represents the binary numeral one, and the signal of the other phase represents the binary numeral zero.

Let it be assumed that the shift register counters of code generators 3 and 29 are in identical counting states and that phase shifter 19 has been set so that zero phase shift between the input and output thereof is produced thereby. Let it be also assumed that an output signal from recorder 21 appearing on line 22 is effective to start clock circuit 1. Thus, when the recorder is started, clock circuit 1 supplies actuating signals to code generator 3 so that transducer 11 injects a vibratory seismic wave into the earth. The vibratory seismic waves will be transmitted through the earth in all directions, and some of the energy content thereof will be detected by geophone 41. A portion of the seismic waves will be transmitted along ray path 17 and will be reflected by a subsurface reflector 15. During the time that the seismic waves are following the ray path 17, the signals from clock circuit 1 will be applied on line 23 to phase shifter 19. The output signals from code generator 29 will be applied to converter 37 and the converted output signals will appear on line 39 at a time determined by the setting of phase shifter 19. The output signals from detector 41 as applied by amplifier 43 will be applied to multiplier 49 of correlating circuit 47 along with the output signal from converter 37. The output signal of the correlator will be dependent upon the degree of time coincidence between the signals on lines 39 and 45. This output signal appearing on line 53 will be recorded by recorder 21.

The output signal of the phase shifter 19 is slowly varied as the phase shifter rotates as it is driven by the recorder. The code sequence produced by code generator 29 is slowly shifted in time by the continuous rotation of phase shifter 19. When the delay of the code sequence from generator 29 matches the transmission time of seismic waves along a ray path, the signals applied to correlator circuit 47 will be in time coincidence and a maximum output signal will be produced on line 53 indicating maximum correlation of the signals.

The invention is not necessarily to be restricted to the specific structural details, arrangement of parts, or circuit connections herein set forth, as various modifications thereof may be effected without departing from the spirit and scope of this invention.

What is claimed is:

1. Apparatus for seismic prospecting, comprising:
a first electrical code generator for producing an electrical signal variable in accordance with a pseudo-random code, responsive to an actuating signal, said generator comprising a multistage shift register binary code pulse generator for producing an electrical pulse train in accordance with a binary code of maximal length, and means for producing an output signal having a sinusoidal waveform variable between opposite phase relationships in accordance with amplitude variations in said pulse train;

an electro-seismic wave transducer at a transmitting location coupled to said code generator for injecting a seismic signal into the earth which is variable in accordance with variations in the output signal of said code generator;

a second electrical code generator for producing an output signal identical to the output signal produced by said first code generator responsive to an actuating signal coupled thereto, said second code generator comprising a second multistage shift register binary code pulse generator for producing an electrical pulse train in accordance with said binary code of maximal length, and means for producing an output signal having a sinusoidal waveform variable between opposite phase relationships in accordance with amplitude variations in said pulse train produced by said second shift register binary code pulse generator;

first and second circuit means respectively connected to said shift register pulse generators, each adapted to produce an electrical output pulse when a predetermined binary code is registered in the stages of the shift register pulse generator coupled thereto;

a time interval counter for measuring the time interval between pulses produced by said first and second circuit means;

seismic wave detecting means at a remote location from said transmitting location for producing an electrical output signal variable in accordance with variations in seismic waves detected thereby;

cross-correlating means electrically coupled to said second code generator and to said seismic wave detecting means for producing an output signal indicative of the correlation between the output signals of said second code generator and said seismic wave detecting means; and means coupled to said first and second code generators for supplying actuating signals thereto, with the actuating signals applied to said first code generator being supplied a predetermined, adjustable time interval before an actuating signal is supplied to said second code generator.

2. Apparatus for seismic prospecting, comprising:
a first electrical code generator for producing an electrical signal variable in accordance with a pseudo-random code, responsive to an actuating signal;
an electro-seismic wave transducer at a transmitting location, coupled to said code generator for injecting a seismic signal into the earth which is variable in accordance with variations in the output signal of said code generator;
a second electrical code generator for producing an output signal identical to the output signal produced by said first code generator, responsive to an actuating signal coupled thereto;
seismic wave detecting means at a remote location from said transmitting location, for producing an electrical output signal variable in accordance with variations in seismic waves detected thereby;
cross-correlating means electrically coupled to said second code generator and to said seismic wave detecting means for producing an output signal indicative of the correlation between the output signals of said second code generator and said seismic wave detecting means;
means coupled to said first and second code generators for supplying actuating signals thereto, with the actuating signals supplied to said first code generator being supplied a predetermined, adjustable time interval before an actuating signal is supplied to said second code generator; and
means connected to said code generators for measuring said time interval.

3. Apparatus for seismic prospecting, comprising:
a first electrical code generator for producing an electrical signal having a characteristic variable in accordance with a pseudo-random code, responsive to an actuating signal;
an electro-seismic wave transducer at a transmitting location coupled to said code generator for injecting a seismic signal into the earth which is variable in accordance with variations in the output signal of said code generator;
a second electrical code generator for producing an output signal identical to the output signal produced by said first code generator, responsive to an actuating signal coupled thereto;
seismic wave detecting means at a remote location from said transmitting location for producing an electrical output signal variable in accordance with variations in seismic waves detected thereby;
cross-correlating means electrically coupled to said second code generator and to said seismic wave detecting means for producing an output signal indicative of the correlation between the output signals of said second code generator and said seismic wave detecting means;
a communications link between said transmitting and remote locations;
means coupled to one of said code generators through said communications link and directly to the other of said code generators for supplying actuating signals to said first and second code generators with an adjustable time interval between the instant at which an actuating signal is supplied to said first code generator and the instant at which an actuating signal is supplied to said second code generator; and
means connected to said code generators for measuring said time interval.

References Cited by the Examiner
UNITED STATES PATENTS

| | | | |
|---|---|---|---|
| 3,185,958 | 5/1965 | Masterson et al. | 340—15.5 |
| 3,221,298 | 11/1965 | Burns | 181—0.5 X |
| 3,234,504 | 2/1966 | Wischmeyer | 181—0.5 X |

BENJAMIN A. BORCHELT, *Primary Examiner.*

SAMUEL FEINBERG, *Examiner.*

M. F. HUBLER, *Assistant Examiner.*